US011255759B2

(12) United States Patent
Mosgaard

(10) Patent No.: US 11,255,759 B2
(45) Date of Patent: Feb. 22, 2022

(54) OBTAINING PRODUCT SAMPLE FROM A VACUUM VESSEL

(71) Applicant: Tetra Laval Holdings & Finance S.A., Pully (CH)

(72) Inventor: Lars Mosgaard, Vodskov (DK)

(73) Assignee: Tetra Laval Holdings & Finance S.A., Pully (CH)

( * ) Notice: Subject to any disclaimer, the term of this patent is extended or adjusted under 35 U.S.C. 154(b) by 292 days.

(21) Appl. No.: 16/620,949

(22) PCT Filed: May 25, 2018

(86) PCT No.: PCT/EP2018/063844
§ 371 (c)(1),
(2) Date: Dec. 10, 2019

(87) PCT Pub. No.: WO2019/007587
PCT Pub. Date: Jan. 10, 2019

(65) Prior Publication Data
US 2020/0200651 A1 Jun. 25, 2020

(30) Foreign Application Priority Data
Jul. 3, 2017 (EP) ..................... 17179403

(51) Int. Cl.
*G01N 1/10* (2006.01)
*G01N 1/22* (2006.01)

(52) U.S. Cl.
CPC ............. *G01N 1/10* (2013.01); *G01N 1/2226* (2013.01); *G01N 2001/1037* (2013.01); *G01N 2001/2238* (2013.01)

(58) Field of Classification Search
CPC ............ G01N 1/10; G01N 2001/1037; G01N 2001/1031; G01N 1/2226; G01N 2001/2238

(Continued)

(56) References Cited

U.S. PATENT DOCUMENTS

| 5,052,224 A | * | 10/1991 | Ford | G01F 23/02 73/325 |
| 10,345,212 B2 | * | 7/2019 | Fraser | B01D 19/0063 |
| 2009/0056438 A1 | * | 3/2009 | Hughes | G01F 23/02 73/323 |

FOREIGN PATENT DOCUMENTS

| DE | 195 47 892 A1 | 7/1997 | |
| GB | 1 250 936 A | 10/1971 | |
| WO | WO-2013112182 A1 * | 8/2013 | ............ C12M 23/34 |

OTHER PUBLICATIONS

International Search Report for corresponding Application No. PCT/EP2018/063844, dated Feb. 11, 2019.

(Continued)

*Primary Examiner* — David L Singer
*Assistant Examiner* — Anthony W Megna Fuentes
(74) *Attorney, Agent, or Firm* — Renner, Otto, Boisselle & Sklar, LLP

(57) ABSTRACT

A method is provided for obtaining a product sample from a vacuum vessel by using a system including a first valve arrangement, a second valve arrangement and a sample receiver connected to the first valve arrangement and the second valve arrangement. The method includes opening the first valve arrangement to provide fluid communication between an upper volume of the vacuum vessel and the sample receiver, opening the second valve arrangement to provide fluid communication between a lower volume of the vacuum vessel and the sample receiver, closing the first valve arrangement and the second valve arrangement, opening the first valve arrangement to provide fluid communication between surrounding atmosphere and the sample receiver, and opening the second valve arrangement to collect the product sample.

11 Claims, 2 Drawing Sheets

Figure 1:
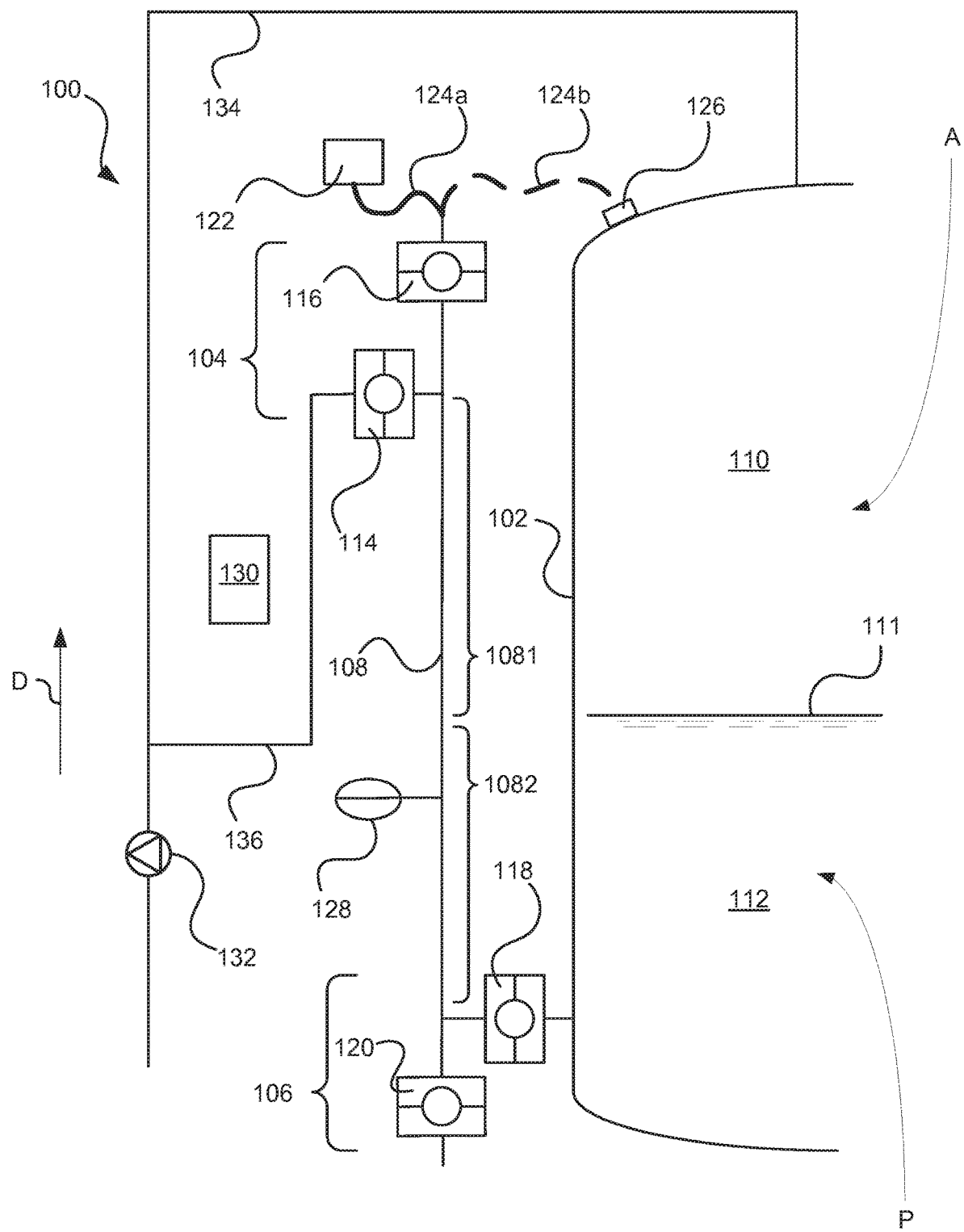

(58) Field of Classification Search
USPC .......................................................... 73/323
See application file for complete search history.

(56) References Cited

OTHER PUBLICATIONS

Extended European Search Report for corresponding Application No. 17179403.5, dated Jan. 8, 2018.

* cited by examiner

OBTAINING PRODUCT SAMPLE FROM A VACUUM VESSEL

TECHNICAL FIELD

The invention relates to a method and system for obtaining a product sample from a vacuum vessel that holds the product, in particular when the product is a food product.

BACKGROUND

Today, in order to make sure that product treatment is made according to pre-set requirements, it is within the food processing industry a common approach to take samples at regular intervals from different parts of a food processing line. For instance, samples may be taken from incoming water intended to be mixed with milk powder in order to make sure that the incoming water is not contaminated. Further, samples may be taken after a mixing step in order to make sure that the milk powder and the water has been mixed into a homogenous product.

Vacuum vessels are commonly used in food processing lines in order to provide efficient treatment and processing of different products. Since a sub-atmospheric pressure is held within the vacuum vessel during operation, opening the vacuum vessel for taking a sample has the consequence that the sub-atmospheric pressure is lost. Also, the increased pressure inside the vacuum vessel may negatively affect the product. In addition, after having taken the sample air needs to be pumped out from the vacuum vessel before re-starting the processing line. This has the effect that the down-time is increased, which affects the overall production economy.

For at least the reasons given above there is a need for a cost efficient and reliable system and a method for obtaining a product sample from a vacuum vessel without releasing the sub-atmospheric pressure of the vacuum vessel. Further, in order to make sure that the system and method can be used in applications requiring high hygienic standards, it is preferable that the method and the system is designed such that cleaning can take place without a need for demounting the whole or parts of the system.

SUMMARY

It is an object of the invention to at least partly overcome one or more of the above-identified limitations of the prior art. In particular, it is an object to provide a method and a system for obtaining a product sample from a vacuum vessel in a cost-efficient and reliable manner.

According to a first aspect it is provided a method for obtaining a product sample from a vacuum vessel by using a system comprising a first valve arrangement, a second valve arrangement and a sample receiver connected to the first valve arrangement and the second valve arrangement. The method comprises opening the first valve arrangement to provide fluid communication between an upper volume of the vacuum vessel and the sample receiver, such that pressure levels inside the vacuum vessel and the sample receiver are equalized, opening the second valve arrangement to provide fluid communication between a lower volume of the vacuum vessel and the sample receiver, such that product flows from the vacuum vessel into the sample receiver, closing the first valve arrangement and the second valve arrangement, to prevent fluid communication between the upper and lower volumes and the sample receiver, opening the first valve arrangement to provide fluid communication between surrounding atmosphere and the sample receiver, such that pressure levels inside the sample receiver and the surrounding atmosphere are equalized, and opening the second valve arrangement, to provide fluid communication between the surrounding atmosphere and the sample receiver, such that the product flows out from the sample receiver.

An advantage with taking the product sample in this manner is that the sub-atmospheric pressure inside the vacuum vessel may be maintained, which reduces the down-time and as an effect improves the production economy. Another advantage is that it can be avoided that air enters the product sample, thereby giving a sample that correctly represents the product inside the vessel.

The step of closing the first valve arrangement and the second valve arrangement may be preceded by receiving level information indicating that the sample receiver is filled up to a target level. An advantage of this is that product samples according to a pre-set volume may be achieved.

The surrounding air may be filtered before entering the sample receiver. An advantage of this is that contaminants and/or unwanted micro-organisms in the surrounding air can be removed before it enters the sample receiver.

The first valve arrangement may comprise a first valve provided between the vacuum vessel and the sample receiver, and a second valve provided between the surrounding air and the sample receiver during the step of opening the first valve arrangement to provide fluid communication between surrounding atmosphere and the sample receiver, wherein the step of opening the first valve arrangement to provide fluid communication between the upper volume of the vacuum vessel and the sample receiver, such that pressure levels inside the vacuum vessel and the sample receiver are equalized, may comprise opening the first valve and closing the second valve, wherein the step of closing the first valve arrangement and the second valve arrangement, to prevent fluid communication between the upper and lower volumes and the sample receiver may comprise closing the first valve, and wherein the step of opening the first valve arrangement to provide fluid communication between surrounding atmosphere and the sample receiver, such that pressure levels inside the sample receiver and the surrounding atmosphere are equalized, may comprise opening the second valve.

The second valve arrangement may comprise a third valve provided between the vacuum vessel and the sample receiver, and a fourth valve provided between the sample receiver and the surrounding air during the step of opening the second valve arrangement, to provide fluid communication between the surrounding atmosphere and the sample receiver, such that the product flows out from the sample receiver, wherein the step of opening the second valve arrangement to provide fluid communication between the lower volume of the vacuum vessel and the sample receiver, such that product flows from the vacuum vessel into the sample receiver may comprise opening the third valve and closing the fourth valve, wherein the step of closing the first valve arrangement and the second valve arrangement, to prevent fluid communication between the upper and lower volumes and the sample receiver, may comprise closing the third valve, and wherein the step of opening the second valve arrangement, to provide fluid communication between the surrounding atmosphere and the sample receiver, such that the product flows out from the sample receiver, may comprise opening the fourth valve.

The method may further comprise cleaning the system by connecting a cleaning-in-place (CIP) system to the system, cleaning the first valve arrangement and the sample receiver, and thereafter cleaning the second valve arrangement. An advantage with cleaning the first valve arrangement before the second valve arrangement is that if the first valve arrangement is placed above the second valve arrangement a risk that product residues drop down from an uncleaned area to a cleaned area is reduced.

The step of connecting the CIP system to the system may comprise connecting the CIP system to the second valve arrangement, and wherein the step of cleaning the first valve arrangement and the sample receiver may comprise opening the first valve, closing the second valve, closing the third valve and opening the fourth valve, and wherein the step of cleaning the second valve arrangement may comprise closing the first valve, closing the second valve, opening the third valve and opening the fourth valve.

The step of cleaning the first valve arrangement and the sample receiver may be preceded by disconnecting a hose, arranged between a filter and the first valve arrangement, from the filter, and connecting the hose to the vacuum vessel such that the hose is arranged between the first valve arrangement and the vacuum vessel, and wherein the step of cleaning the first valve arrangement and the sample receiver, further may comprise cleaning the hose by closing the first valve, opening the second valve, closing the third valve and opening the fourth valve. An advantage with this is that also the hose may be properly cleaned.

The product sample may be a sample of a fluid food product.

According to a second aspect it is provided a system for obtaining a product sample from a vacuum vessel. The system comprises a first valve arrangement configured to be connected to an upper volume of the vacuum vessel, and a second valve arrangement configured to be connected to a lower volume of the vacuum vessel, a sample receiver arranged between the first valve arrangement and the second valve arrangement, wherein the first valve arrangement is arranged to provide fluid communication between an upper volume of the vacuum vessel and the sample receiver, such that pressure levels inside the vacuum vessel and the sample receiver are equalized, to prevent fluid communication between the upper volume and the sample receiver, or to provide fluid communication between surrounding atmosphere and the sample receiver, such that pressure levels inside the sample receiver and the surrounding atmosphere are equalized, wherein the second valve arrangement is arranged to provide fluid communication between a lower volume of the vacuum vessel and the sample receiver, such that product flows from the vacuum vessel into the sample receiver, to prevent fluid communication between the lower volume and the sample receiver, and to provide fluid communication between the surrounding atmosphere and the sample receiver, such that the product flows out from the sample receiver. The system according to the second aspect has the same advantages as the method according to the first aspect.

The first valve arrangement may be connected to a filter, such as a sterile filter. An advantage of this is that contaminants and/or unwanted micro-organisms in the surrounding air can be removed before it enters the sample receiver.

The first valve arrangement and the filter may be connected to each other via a hose during a sample reception state, wherein the hose is releasably attached to the filter such that the hose during a cleaning state can be released from the filter and attached to a connector of the vacuum vessel such that fluid communication is provided between the hose and the upper volume of the vacuum vessel. An advantage with this is that also the hose may be properly cleaned.

The sample receiver may be provided with a level indicator. An advantage with this is that product samples according to a pre-set volume may be achieved.

The system may further comprise a control device configured to execute instructions for obtaining a sample, wherein the instructions comprise opening the first valve arrangement to provide fluid communication between an upper volume of the vessel and the sample receiver, such that pressure levels inside the vacuum vessel and the sample receiver are equalized, opening the second valve arrangement to provide fluid communication between a lower volume of the vessel and the sample receiver, such that product flows from the vacuum vessel into the sample receiver, closing the first valve arrangement and the second valve arrangement, to prevent fluid communication between the upper and lower volumes and the sample receiver, opening the first valve arrangement to provide fluid communication between surrounding atmosphere and the sample receiver, such that pressure levels inside the sample receiver and the surrounding atmosphere are equalized, and opening the second valve arrangement, to provide fluid communication between the surrounding atmosphere and the sample receiver, such that the product flows out from the sample receiver.

Still other objectives, features, aspects and advantages of the invention will appear from the following detailed description as well as from the drawings.

DRAWINGS

Embodiments of the invention will now be described, by way of example, with reference to the accompanying schematic drawings, in which FIG. 1 is a schematic view of a system for obtaining a product sample from a vacuum vessel.

Figure 2:
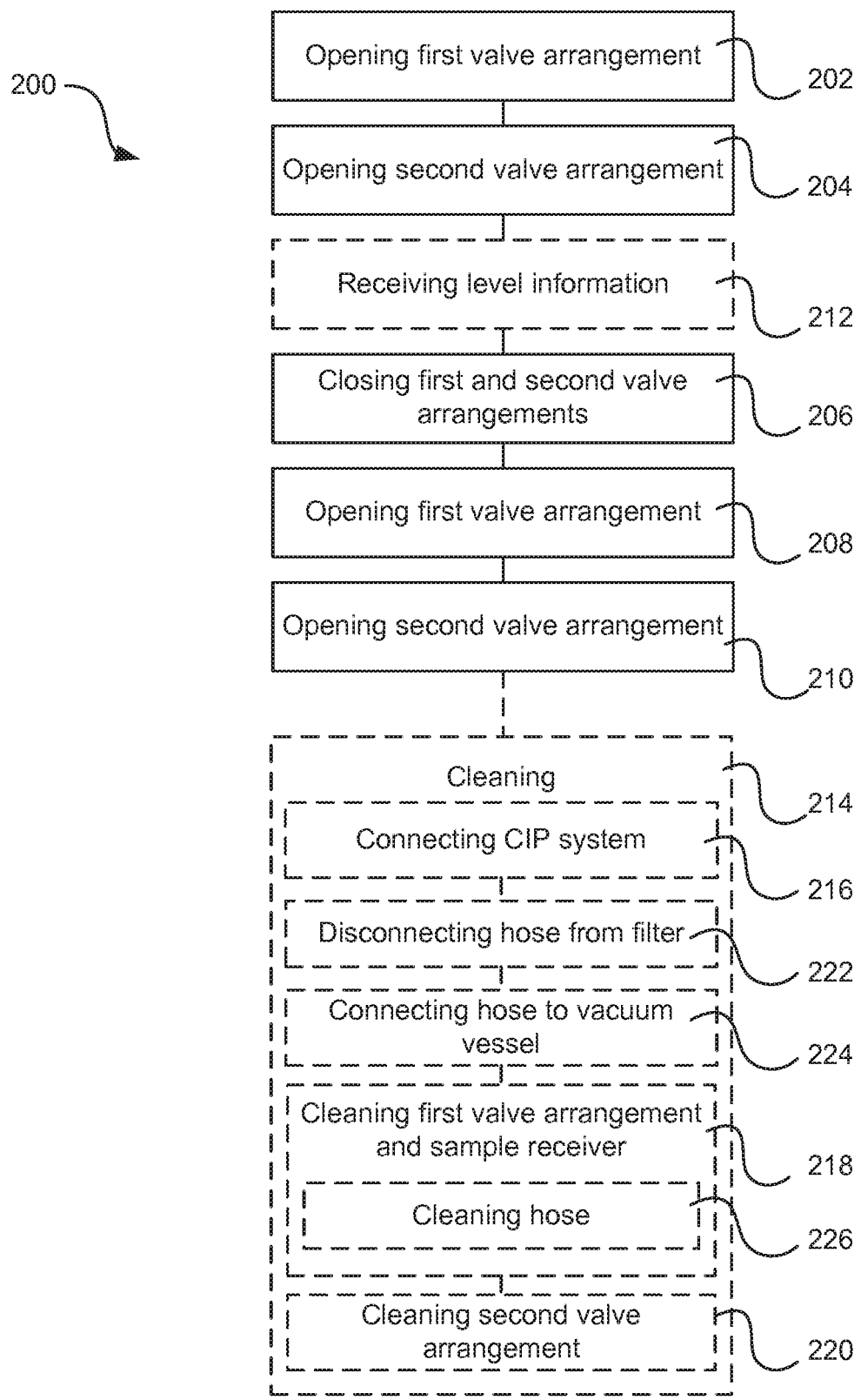

FIG. 2 is a flow chart illustrating a method for obtaining a product sample.

DESCRIPTION

With reference to FIG. 1 a system 100 for obtaining a product sample from a vacuum vessel 102 is illustrated. The vacuum vessel 102 may be part of a liquid food processing line and may be used for mixing powder with liquid, e.g. mixing milk powder with water in order to form re-combined milk, or for any other purpose within the field of food processing where a vacuum vessel is needed. An advantage of the system 100 is that the product sample may be obtained during operation, i.e. a low pressure held within the vacuum vessel 102 can be maintained, which reduces cost of operation both in terms of reduced energy usage and reduced down time. It should be noted that "vacuum" does not necessarily mean that that there is an absolute vacuum inside the vessel 102. Instead, vacuum means that a pressure inside the vessel 102 is lower than that of the atmosphere surrounding the vessel 102. The pressure inside the vacuum vessel 102 is typically at least 1 bar lower than the atmospheric pressure surrounding the vessel 102.

In order to be able to obtain the product sample from the vacuum vessel 102 a first valve arrangement 104 and a second valve arrangement 106 are connected to the vacuum vessel 102. Between the first valve arrangement 104 and the second valve arrangement 106 a sample receiver 108 is provided, for instance in the form of a pipe. The first valve arrangement 104 is connected to an upper volume 110 of the vacuum vessel 102. The upper volume 110 is during operation filled with primarily gas, e.g. air A. The upper volume 110 can be defined as a space inside the vacuum vessel 102 above a product level 111. This space includes all pipes and devices that are in fluid communication with an interior part of the vacuum vessel that does not contain any product. Such pipes and devices allow gas to pass from and to the vessel, and have thus the same pressure as the interior of the vacuum vessel 102.

The second valve arrangement 106 is connected to a lower volume 112 of the vacuum vessel 102. During operation the lower volume 112 is filled with liquid product P. The lower volume 111 can be defined as a space inside the vacuum vessel 102 below the product level 111. This space includes all pipes and devices that are in fluid communication with an interior part of the vacuum vessel that contains product. Such pipes and devices allow product to pass from and to the vessel, and may thus contain the same product as the interior of the vacuum vessel 102.

The first valve arrangement 104 may comprise of a first valve 114, provided between the sample receiver 108 and the vacuum vessel 102, and a second valve 116, provided between the sample receiver 108 and surrounding air (atmosphere). The second valve arrangement 106 may comprise two valves, here referred to as a third valve 118, provided between the sample receiver 108 and the vacuum vessel 102, and a fourth valve 120, provided between the sample receiver 108 and the surrounding air. The first and second valves 114, 116 may have the form of individual valves. They may also be embodied as a three-way valve. In a similar manner, the third and fourth valves 118, 120 may have the form of individual valves, or they may be embodied as a three-way valve. Another, alternative valve configurations are conceivable.

In order to reduce a risk that the surrounding air fed into the sample receiver 108 via the first valve arrangement 104 contain germs, bacteria or other unwanted microorganisms, a filter 122, such as a sterile filter, may be used.

The filter 122 may be connected to the first valve arrangement 104, more particularly the second valve 116 of the first valve arrangement 104, via a hose 124a during a sample reception state, i.e. when a product sample is obtained. An advantage of having the filter 122 connected to the first valve arrangement 104 via the hose 124a is that during a cleaning state the hose 124a may be disconnected from the filter 122 and connected to a connector 126 of the vacuum vessel 102 such that the hose 124b instead provides liquid communication between the first valve arrangement 104 and the upper volume 110 of the vacuum vessel 102. This may facilitate cleaning of the apparatus 100.

In order to be able to obtain product samples with a pre-set (defined) volume, a level indicator 128 may be provided in the sample receiver 108. The level indicator 128 may be an electronic level sensor that automatically transmits a signal when a product level in the sample receiver 108 has reached a target level. Alternatively or as a complement, a sight glass may be provided in the sample receiver 108, so that an operator may determine when the pre-set volume has been filled in the sample receiver (108).

A sequence for obtaining the product sample may be handled by a control device 130. Even though not illustrated, the control device 130 is connected, by wire or wireless, to the first and second valve arrangement 104, 106 and to the level indicator 128. Further, the control device 130 may be provided with a user interface, for instance in the form of a display, on which information can be provided to a user.

The control device 130 may be implemented by hardware components, or a combination of hardware components and software instructions. The software instructions may be executed by a processor in conjunction with an electronic memory in the control device 130. The software instructions may be supplied to the control device 130 on a computer-readable medium, which may be a tangible (non-transitory) product (e.g. magnetic medium, optical disk, read-only memory, flash memory, etc) or a propagating signal. In one embodiment, the control device 130 is a PLC. It should understood that the control device 130 may also be configured to control functions of the vacuum vessel 120, as well as other parts of a processing system the vacuum vessel 102 is part of.

In order to achieve sub-atmospheric pressure inside the vacuum vessel 102 a vacuum pump 132 may be used. The vacuum pump 132 may be connected to the upper volume 110 of the vacuum vessel 102 via a vacuum pipe 134. The first valve arrangement 104, more particularly the first valve 114, may be connected to the vacuum pipe 134 via a connection pipe 136 such that fluid communication between the first valve arrangement 104 and the upper volume 110 is provided. The first valve arrangement 104 may of course be connected directly to the upper volume 110 of the vacuum vessel 102, or to any other component that has the same pressure as the upper volume 110 of the vacuum vessel 102.

A method 200 for obtaining a product sample from the vacuum vessel 102 is illustrated in the form of a flow chart in FIG. 2.

In a first step, the first valve arrangement 104 is opened 202 such that fluid communication between the upper volume 110 of the vacuum vessel 102 and the sample receiver 108 is provided. An effect of having fluid communication between the upper volume 110 and the sample receiver 108 is that pressure levels inside the vacuum vessel 102 and the sample receiver 108 are equalized. If having a set-up as illustrated in FIG. 1, this may be achieved by opening the first valve 114 while having the second 116, third 118 and fourth valve 120 closed.

Thereafter the second valve arrangement 106 is opened 204 such that fluid communication between a lower volume 112 of the vacuum vessel 102 and the sample receiver 108 is provided. An effect of this is that product flows from the vacuum vessel 102 into the sample receiver 108. If having a set-up as illustrated in FIG. 1, this may be achieved by opening the third valve 118 while having the second valve 116 and the fourth valve 120 closed. Since the first valve arrangement 104 is opened such that fluid communication between the upper volume 110 and the sample receiver 108 may be provided, gas held in the sample receiver 108 may be pushed into the upper volume 110 as product flows into the sample receiver 108 via the second valve arrangement 106.

Next the first and second valve arrangements 104, 106 are closed 206 to prevent fluid communication between the upper and lower volumes 110, 112 and the sample receiver 108. If having the set-up as illustrated in FIG. 1, this may be achieved by closing the first valve 114 and the third valve 118. By closing the first and second valve arrangement 104, 106 in this way the product that has flown into the sample receiver 108 is separated from the product in the vacuum vessel 102.

After having closed the fluid communication between the vacuum vessel 102 and the sample receiver 108 the first valve arrangement 104 is opened 208 to provide fluid communication between surrounding atmosphere and the sample receiver 108. An effect of this is that pressure levels inside the sample receiver 108 and the surrounding atmosphere are equalized. If having the set-up as illustrated in FIG. 1, this may be achieved by opening the second valve 116.

Next, the second valve arrangement 106 is opened to 210 provide fluid communication between the surrounding atmosphere and the sample receiver 108, such that the product may flow out from the sample receiver 108. If having the set-up as illustrated in FIG. 1, this may be achieved by opening the fourth valve 120. The product that flows out from the sample receiver 108 flows out though an outlet of the sample receiver 108, and may then be collected by an operator in any suitable container.

In order to provide for that product samples according to a pre-set volume is obtained, the closing 206 may be initiated upon receiving 212 level information indicating that the sample receiver 108 is filled up to the target level. The level information may be provided by the level indicator 128 illustrated in FIG. 1.

At regular intervals or after having obtained the product sample the system 100 may be cleaned in a cleaning step 214. The cleaning 214 may comprise sub-steps of connecting 216 a conventional cleaning-in-place (CIP) system to the system 100, cleaning 218 the first valve arrangement 104 and the sample receiver 108, and cleaning 220 the second valve arrangement 106. If having the first valve arrangement 104 and the sample receiver 108 placed above the second valve arrangement 106 this order is an advantage because the risk that product residues drop down from a not yet cleaned area into a cleaned area can be reduced. Obviously, the cleaning includes that the CIP systems pumps cleaning liquid through the sample system 100, with the valves being opened and closed as, for example, described herein.

More particularly, the connecting 216 of the CIP system to the system 100 may comprise connecting the CIP system to the second valve arrangement 106. The cleaning 218 of the first valve arrangement 104 and the sample receiver 108 may comprise opening the first valve 114, closing the second valve 116, closing the third valve 118 and opening the fourth valve 120. The cleaning of 220 the second valve arrangement 106 may comprise closing the first valve 114, closing the second valve 116, opening the third valve 118 and opening the fourth valve 120.

In order to provide for that the second valve 116 and the hose 124a are properly cleaned, the cleaning 218 of the first valve arrangement 104 and the sample receiver 108 may be preceded by disconnecting 222 the hose 124a, arranged between the filter 122 and the first valve arrangement 104, from the filter 122, and connecting 224 the hose 124b to the vacuum vessel 102 such that the hose 120b is arranged between the first valve arrangement 104 and the vacuum vessel 102. By this operation the cleaning 218 of the first valve arrangement 104 and the sample receiver 108 may further comprise cleaning 226 the hose 124b by closing the first valve 114, opening the second valve 116, closing the third valve 118 and opening the fourth valve 120.

In other words, by moving the hose 124a placed between the first valve arrangement 104, more particularly the second valve 116, and the filter 122 to be placed between the first valve arrangement 104, more particularly the second valve 116, and the vacuum vessel 102 cleaning liquid may flow through the first valve arrangement 104, more particularly the second valve 116, and the hose 124b into the vacuum vessel 102. An advantage of this is that also the hose 124b and the second valve 116 can be cleaned properly.

If the second valve 116 and the hose 124b are placed above the first valve 114 the cleaning 226 of the hose 124b may be made before the cleaning 218 of the first valve arrangement 104 and the sample receiver 108 in order to reduce the risk that product residues drop down from the uncleaned area to the cleaned area.

As may be seen, the sample receiver 108 has an upper section 1081 and a lower section 1082. The upper section 1081 is, as seen in a vertical direction D, at least partly located above the lower section 1082. The vertical direction D is the direction which is aligned with the direction of the force of gravity.

When taking a sample, the opening 202 that allows pressure levels inside the vacuum vessel 102 and the sample receiver 108 to be equalized comprises letting gas flow out from the sample receiver 108 via the first valve arrangement 104. This gas flows into the vacuum vessel 102 until the pressure in the sample receiver 108 is same as in the vacuum vessel 102.

The opening 204 that allows product to flow from the vacuum vessel 102 into the sample receiver 108 comprises letting product flow into the sample receiver 108 via the second valve arrangement 106. The product then flows into the sample receiver 108 at least partly in a direction against the direction of the force of gravity. The first valve arrangement 104 (in the illustrated embodiment the first valve 114) is then open so that the product can push out some gas from the receiver 108, which gas then flows into the vacuum vessel 102. The volume of the pushed out gas corresponds to the volume of product that is let into the receiver 108.

As described, next the first valve arrangement 104 and the second valve arrangement are closed 206 to prevent fluid communication between the upper and lower volumes 110, 112 and the sample receiver 108.

The opening 208 that allows pressure levels inside the sample receiver 108 and the surrounding atmosphere to equalize comprises letting gas flow into the sample receiver 108 via the first valve arrangement 104. The gas then flows into the sample receiver 108 without flowing through the product that is located inside the sample receiver 108.

The opening 210 that allows the product to flow out from the sample receiver 108 comprises letting product flow out from the sample receiver 108 via the second valve arrangement 106. The product then flows out from the sample receiver 108 at least partly in the same direction as the direction of the force of gravity, i.e. it is the gravity that causes the product to flow out from the sample receiver 108. Typically, at the same time some additional gas flows into the sample receiver 108. This additional gas flows into the receiver via the first valve arrangement 104 (by having valve 116 open) and the volume of the additional gas corresponds the volume of product that has flown out form the receiver 108 as a product sample.

The word "vacuum vessel" is a commonly used word in the food processing industry for a vessel that is made to achieve an inside pressure well below atmospheric pressure in order to e.g. provide efficient mixing of different ingredients, and the same meaning should apply in this context.

From the description above follows that, although various embodiments of the invention have been described and shown, the invention is not restricted thereto, but may also be embodied in other ways within the scope of the subject-matter defined in the following claims.

The invention claimed is:

1. A method for obtaining a product sample from a vacuum vessel by using a system comprising a first valve arrangement, a second valve arrangement and a sample receiver connected to the first valve arrangement and the second valve arrangement, the method comprising:

opening the first valve arrangement to provide fluid communication between an upper volume of the vacuum vessel and the sample receiver, such that pressure levels inside the vacuum vessel and the sample receiver are equalized, opening the second valve arrangement to provide fluid communication between a lower volume of the vacuum vessel and the sample receiver, such that product flows from the vacuum vessel into the sample receiver, closing the first valve arrangement and the second valve arrangement, to prevent fluid communication between the upper and lower volumes and the sample receiver, opening the first valve arrangement to provide fluid communication between surrounding atmosphere and the sample receiver, such that pressure levels inside the sample receiver and the surrounding atmosphere are equalized, and opening the second valve arrangement, to provide fluid communication between the surrounding atmosphere and the sample receiver, such that the product flows out from the sample receiver.

2. The method according to claim 1, wherein the closing of the first valve arrangement and the second valve arrangement is preceded by receiving level information indicating that the sample receiver is filled up with the product to a target level.

3. The method according to claim 1, wherein opening of the first valve arrangement comprises filtering air that enters the sample receiver.

4. The method according to claim 1, wherein the first valve arrangement comprises a first valve connected to provide fluid communication between the sample receiver and a volume of the vacuum vessel that is located above a product level of the product that is held in the vacuum vessel, and a second valve connected to provide fluid communication between the sample receiver and the atmosphere surrounding the sample receiver.

5. The method according to claim 1, wherein the second valve arrangement comprises a third valve connected to provide fluid communication between the sample receiver and a volume of the vacuum vessel that is located below a product level of the product that is held in the vacuum vessel, and a fourth valve connected to provide fluid communication between the sample receiver and the atmosphere surrounding the sample receiver.

6. The method according to claim 1, wherein the product is a fluid food product.

7. The method according to claim 1, wherein the sample receiver comprises an upper section and a lower section, the upper section being, as seen in a vertical direction, at least partly located above the lower section, the opening that allows pressure levels inside the vacuum vessel and the sample receiver to be equalized comprises letting gas flow out from the sample receiver via the first valve arrangement, the opening that allows product to flow from the vacuum vessel into the sample receiver comprises letting product flow into the sample receiver via the second valve arrangement, the opening that allows pressure levels inside the sample receiver and the surrounding atmosphere to equalize comprises letting gas flow into the sample receiver via the first valve arrangement, and the opening that allows the product to flow out from the sample receiver comprises letting product flow out from the sample receiver (108) via the second valve arrangement.

8. A system for obtaining a product sample from a vacuum vessel, said system comprising:

a first valve arrangement configured to be in fluid communication with an upper volume of the vacuum vessel, and a second valve arrangement configured to be in fluid communication with a lower volume of the vacuum vessel, a sample receiver arranged between the first valve arrangement and the second valve arrangement;

wherein the first valve arrangement is arranged to:
provide fluid communication between the upper volume of the vacuum vessel and the sample receiver, such that pressure levels inside the vacuum vessel and the sample receiver are equalized,
prevent fluid communication between the upper volume and the sample receiver, and
provide fluid communication between surrounding atmosphere and the sample receiver, such that pressure levels inside the sample receiver and the surrounding atmosphere are equalized;

wherein the second valve arrangement is arranged to
provide fluid communication between the lower volume of the vacuum vessel and the sample receiver, such that product flows from the vacuum vessel into the sample receiver,
prevent fluid communication between the lower volume and the sample receiver, and
provide fluid communication between the surrounding atmosphere and the sample receiver, such that the product flows out from the sample receiver; and a control device configured to execute software instructions for obtaining the product sample, wherein said instructions controls the valve arrangements to open the first valve arrangement to provide fluid communication between the upper volume of the vessel and the sample receiver, such that pressure levels inside the vacuum vessel and the sample receiver are equalized, open the second valve arrangement to provide fluid communication between the lower volume of the vessel and the sample receiver, such that product flows from the vacuum vessel into the sample receiver, close the first valve arrangement and the second valve arrangement, to prevent fluid communication between the upper and lower volumes and the sample receiver, open the first valve arrangement to provide fluid communication between the surrounding atmosphere and the sample receiver, such that the pressure levels inside the sample receiver and the surrounding atmosphere are equalized, and open the second valve arrangement, to provide fluid communication between the surrounding atmosphere and the sample receiver, such that the product flows out from the sample receiver.

9. The system according to claim 8, wherein the first valve arrangement is connected to a filter.

10. The system according to claim 9, wherein the first valve arrangement and the filter are connected to each other via a hose during a sample reception state, wherein the hose is releasably attached to the filter such that the hose during a cleaning state is released from the filter and attached to a connector of the vacuum vessel such that fluid communication is provided between the hose and the upper volume of the vacuum vessel.

11. The system according to claim 8, wherein the sample receiver comprises a level indicator.

\* \* \* \* \*